July 25, 1933.  J. FINN, JR  1,919,626
APPARATUS FOR PURIFYING EXHAUST GAS
Filed Oct. 15, 1930
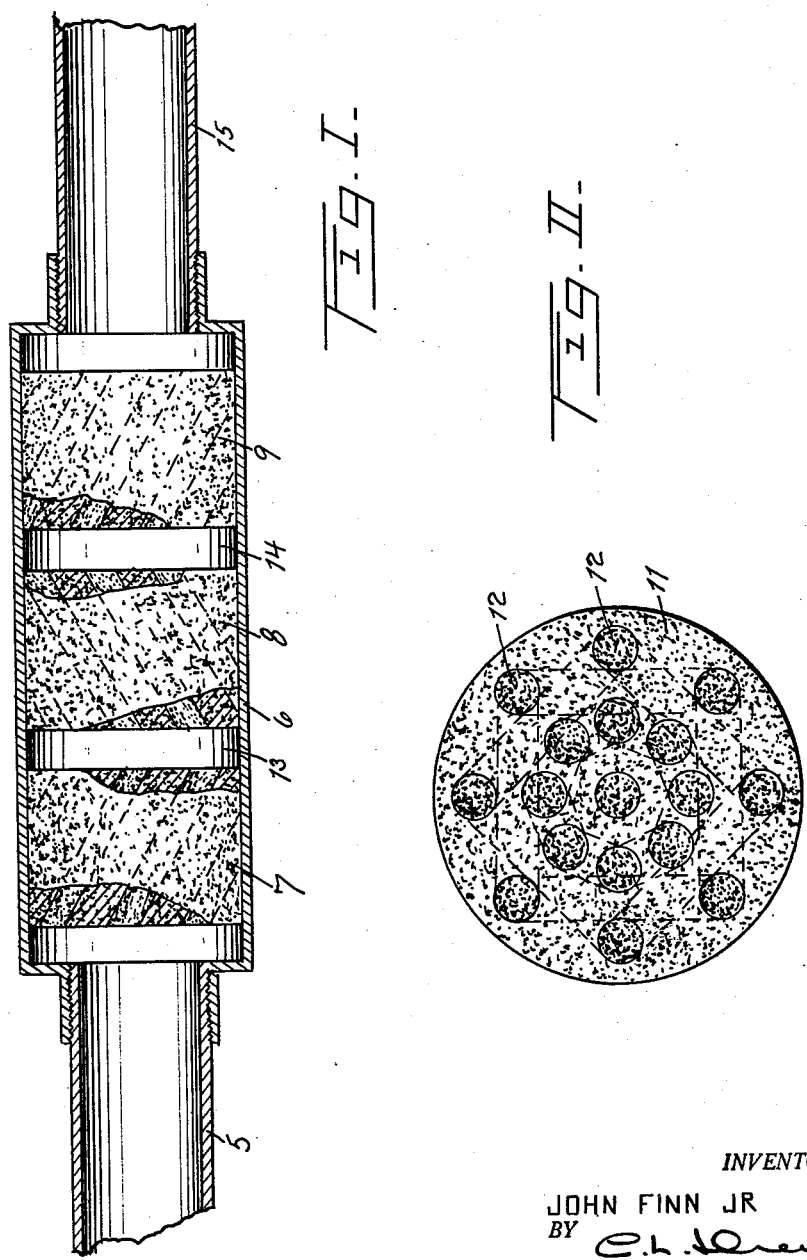
INVENTOR.
JOHN FINN JR
BY
ATTORNEY Patented July 25, 1933

1,919,626

UNITED STATES PATENT OFFICE

JOHN FINN, JR., OF SAN FRANCISCO, CALIFORNIA

APPARATUS FOR PURIFYING EXHAUST GAS

Application filed October 15, 1930. Serial No. 488,893.

This invention relates to improvements in gas purifying devices and has particular reference to a device for purifying the exhaust gas of an internal combustion engine or any other gases containing carbon monoxide in a heated state.

The principal object of this invention is to produce a device wherein the carbon monoxide will be treated in such manner as to render the gas non-poisonous.

A further object is to produce a device of this character wherein the agents employed for accomplishing the purifying of the gas, are of such a nature that they will not be destroyed thru use.

A further object is to produce a device of this character which is economical to manufacture, and one which can be attached to the ordinary motor vehicle without altering its construction or adding materially to its expense.

Other objects and advantages will be apparent during the course of the following description.

In the accompanying drawing forming a part of this specification and in which like numerals are employed to designate like parts throughout the same, Figure 1 is a cross-sectional view of a purifying chamber as the same would appear when interposed in an exhaust manifold, and Figure 2 is an enlarged front elevation of one of the purifying blocks in the purifying chamber.

Internal combustion engines give off a large percentage of carbon monoxide, which gas is poisonous, odorless, tasteless and therefore a very dangerous gas; in that it will have a fatal effect upon a person breathing a large amount of it. Even a small amount over a long period of time is fatal.

I have therefore devised an apparatus to obviate the above described danger. It is my theory that the apparatus functions in such manner, as to act upon the exhaust gas and first disassociate the water content of the gas so that the oxygen in a nascent state will combine with the carbon monoxide and produce carbon dioxide; which is not harmful. In accomplishing this, I attach to the ordinary exhaust manifold 5, a purifying chamber 6, within which chamber are spaced porous blocks, 7, 8 and 9. These porous blocks are preferably made of pumice, but any other suitable composition having a porous nature may be used. These blocks are preferably cast or drilled with a plurality of holes 12 there-thru, which holes are diagonally arranged as is best illustrated in Fig. 1. These blocks are then impregnated as follows:—The block 7 is impregnated with metallic platinum in a finely divided state. This may be accomplished in several different ways, as for instance by impregnating the block with platinic chloride, and then reducing the same to metallic platinum by heat. The blocks 8 and 9 are impregnated with any one of several catalytic agents, or a combination of the same. These catalytic agents are preferably zincoxide, magnesiumoxide, or copperoxide and serve to cooperate with the platinum to enhance the exidation of the carbon monoxide.

The operation of my device is as follows:— The gas passing from the internal combustion engine thru the pipe 5 enters the purifying chamber 6 where it encounters the block 7. It will here be noted that the combined area of the holes 12 is greater than the area of the pipe 5. This is true of the holes in all of the blocks, and as a result, the speed of the gas thru the purifying chamber will be reduced, thus giving the gas a greater time to be acted upon during its purifying process. As the gas passes thru the block 7 it will come into contact with the metallic platinum which it is thought will act to disassociate the oxygen and hydrogen contained in the water content of the gas, which disassociation will produce nascent oxygen and when the gas emerges from the block 7, it will enter the space 13 where turbulence will be set up. From this space, the gas will enter the block 8 and will come into contact with the catalytic agent contained within the block. This catalytic agent cooperates with the platinum to aid in the oxidation of the carbon monoxide; and it is thought that the catalytic agent will cause the oxygen in the nascent state to combine with the carbon monoxide so as to produce carbon dioxide, and as the gas emerges from the block 8 into the space 14, turbulence will again be set up previous to the gas entering the block 9 where catalytic action will take place, tending to combine any small amounts of oxygen and monoxide still left in the gas. The gas will then pass out of the exhaust pipe 15 to the atmosphere.

Applicant has found from numerous experiments in engines of various types, that he can reduce the carbon monoxide to a point where only a trace is present, which is far below the danger line, as set forth in any well established treatises on this subject.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. An apparatus for purifying the exhaust gas from an internal combustion engine, comprising a chamber adapted to be attached to the exhaust pipe connected to said engine; means in said chamber holding platinum, and additional means in said chamber holding a catalytic agent capable of cooperating with the platinum to enhance the oxidation of carbon monoxide contained in the exhaust gas.

2. An apparatus for purifying the exhaust gas from an internal combustion engine, comprising a chamber adapted to be attached to the exhaust pipe connected to said engine; means in said chamber holding platinum, and additional means in said chamber holding a catalytic agent capable of cooperating with the platinum to enhance the oxidation of carbon monoxide contained in the exhaust gas, said first mentioned means being positioned ahead of the second mentioned means with respect to the flow of the exhaust gas.

3. An apparatus for purifying the exhaust gas from an internal combustion engine comprising a chamber adapted to be attached to the exhaust pipe connected to said engine, a plurality of porous blocks positioned within said chamber one of said blocks having a deposit of platinum thereon, and another of said blocks having a deposit of a catalytic agent capable of cooperating with the platinum to enhance the oxidation of carbon monoxide contained in the exhaust gas, said first mentioned block being positioned ahead of the second mentioned block with respect to the flow of the exhaust gas.

4. An apparatus for purifying the exhaust gas from an internal combustion engine, comprising a chamber adapted to be attached to the exhaust pipe connected to said engine, and a plurality of porous blocks for holding gas purifying substances positioned within the chamber, said blocks being spaced one from the other and having passages therethrough, the passages being diagonally disposed so as to cause a turbulence of the gas between said blocks.

5. An apparatus for purifying the exhaust gas from an internal combustion engine, comprising a chamber adapted to be attached to the exhaust pipe connected to said engine, and a plurality of porous blocks for holding gas purifying substances positioned within the chamber, said blocks being spaced one from the other and having passages therethrough, the passages being diagonally disposed so as to cause a turbulence of the gas between said blocks, and the combined cross sectional area of the passages in each block being greater than the cross sectional area of the exhaust pipe so as to effect reduction of the exhaust gas speed thru the chamber.

JOHN FINN, Jr.